United States Patent [19]

Carlson et al.

[11] Patent Number: 4,629,652

[45] Date of Patent: Dec. 16, 1986

[54] PRODUCTION OF AEROGELS ON A SUPPORT

[75] Inventors: Emery J. Carlson, Chatham; John N. Armor, Hanover Township, Morris County, both of N.J.

[73] Assignee: Allied Corporation, Morris Township, Morris County, N.J.

[21] Appl. No.: 656,820

[22] Filed: Oct. 1, 1984

[51] Int. Cl.$^4$ ............................ B32B 9/00; B05D 1/12
[52] U.S. Cl. ................................ 428/304.4; 427/180; 427/294; 428/306.6; 428/315.5; 428/331; 428/403; 428/404
[58] Field of Search ............... 428/305.5, 306.6, 307.3, 428/307.7, 308.4, 403, 404, 406, 320.2, 321.1, 312.2, 312.6, 312.8, 315.5, 315.7, 315.9, 331; 427/180, 294

[56] References Cited

U.S. PATENT DOCUMENTS

| | | | |
|---|---|---|---|
| 2,893,962 | 7/1959 | Bartell | 428/304.4 |
| 4,221,672 | 9/1980 | McWilliams | 428/317.9 |
| 4,259,401 | 3/1981 | Chahroudi et al. | 428/320.2 |
| 4,399,175 | 8/1983 | Kummermehr et al. | 428/76 |
| 4,447,345 | 5/1984 | Kummermehr et al. | 428/76 |

OTHER PUBLICATIONS

*The Properties of Gases and Liquids*, by Robert C. Reid and Thomas K. Sherwood, Chapters 5–7, pp. 169–570, Second Edition, McGraw-Hill, N.Y. (no date).

*Primary Examiner*—William J. Van Balen

[57] ABSTRACT

A widely applicable and simple technique has been discovered for preparing aerogels in more durable forms. By the exposure of a variety of support structures to a pregel heated to hypercritical conditions, the resulting aerogel is produced and retained on the supporting structure. Thus, the aerogels are prepared and "pelletized" in one step.

7 Claims, 16 Drawing Figures

PRODUCTION OF AEROGELS ON A SUPPORT

BACKGROUND OF THE INVENTION

This invention relates to the production of "pelletized" aerogels by exposing a support structure to a pregel heated to hypercritical conditions. Upon venting the fluid phase under the hypercritical conditions, the aerogel forms on and/or within the support structure. The "pelletized" products produced by this process are much easier to handle than aerogels products formed by any prior art processes.

Aerogels are materials which have unusually high surface areas and pore volumes. Generally, they exhibit a very low bulk density (0.03–0.1 g/cc). Ordinarily, aerogels are obtained either as chunky (approximately 0.6–7.6 cm), but very soft (gel-like) granules, or as light dusty materials directly from an autoclave. In either form, aerogels present difficulties in handling.

Aerogels are usually produced by initially dissolving or suspending a metal ion (generally referred to as solute; usually added as the hydroxide, alkoxide or acetate) in an aqueous or alcohol (or both) medium. The medium hydrolizes and gels the metal salt to produce a pregel including a reaction liquid and the aerogel forming compound. Upon heating the pregel (aquagel or alcogel) to a temperature above the critical temperature of its aqueous or alcohol medium, the pregel is converted to the aerogel forming compound and a fluid phase. The fluid phase is then vented under hypercritical conditions to yield the aerogel. This method of reaction liquid (solvent) removal avoids the inherent shrinkage of the solid product which occurs when conventional drying techniques are employed. Aerogels have been proposed for use as catalysts, insulators, Cerenkov detectors, battery separators and solar plate collectors.

Numerous publications and patents exist which discuss metal oxide-aerogel production and use. S. J. Teichner et al., "Inorganic Oxide Aerogels," *Advances in Colloid and Interface Science*, Volume 5, 1976, pp 245–73, disclose the general method described supra for the preparation of inorganic oxide aerogels such as $SiO_2$, $Al_2O_3$, $TiO_2$, $ZrO_2$, MgO and mixed oxides, and the use of certain aerogels ($SiO_2$) as Cerenkov radiators. U.S. Pat. No. 3,963,646 (Teichner et al.) discloses the preparation of mixed oxide aerogels useful as catalysts. U.S. Pat. No. 4,268,317 (Rayl) discloses aerogels useful as insulators. U.S. Pat. No. 4,287,276 (Lundquist et al.) discloses aerogels useful as battery separators. European Pat. No. 18-955 (Von Dardel) discloses aerogels useful as solar plate collectors.

In addition to metal oxide aerogels, other compositions can be used for forming aerogels. For example, U.S. Pat. No. 3,210,273 recognizes the use of organosilica compounds for forming aerogels and U.S. Pat. No. 3,203,903 discloses the use of clays as aerogel materials.

Aerogels can be shaped into pellet form by pressing. Unfortunately, aerogels are very fragile and care must be taken to use low pressure during pelleting in order to avoid a marked decrease in pore volume. However, using low pressure to maintain a high pore volume product produces a pellet which is structurely weak and difficult to handle.

We have discovered a novel method for producing aerogels which not only aids in improving collection of the aerogels from the reaction chamber but also provides novel products which are much more suitable for handling and which can be used in a variety of applications.

SUMMARY OF THE INVENTION

The invention is drawn to a process for the production of aerogel "pellets" and the aerogel "pellets" produced by the process. The process comprises the steps of: producing a pregel comprising a reaction liquid and an aerogel-forming composition; heating the pregel to hypercritical conditions such that the reaction liquid is converted to a fluid phase; venting the fluid phase under hypercritical conditions to yield an aerogel; and exposing an object to the aerogel-forming composition prior to venting to cause the aerogel to collect on the object. The product is a composite comprising a support material and an aerogel adhering to at least a portion of the support material, the bulk density of the adhering aerogel being substantially the same in the final form of the composite product as the bulk density of the aerogel upon formation thereof.

DETAILED DESCRIPTION OF THE INVENTION

The present invention is directed to the preparation of pelletized aerogels. The pelletized aerogels are formed by exposing a support to a pregel heated to hypercritical conditions such that, upon venting the fluid phase under such hypercritical conditions, the aerogel forms on the support. The term pregel includes solutions, suspensions, mixtures and gels. The term pelletized aerogel refers to the composite comprising the supports structure and the aerogel formed thereon. The term hypercritical conditions is defined as that temperature and pressure at which the alcohol or aqueous medium (or both) is converted from a liquid phase to a fluid phase.

Figure 1:
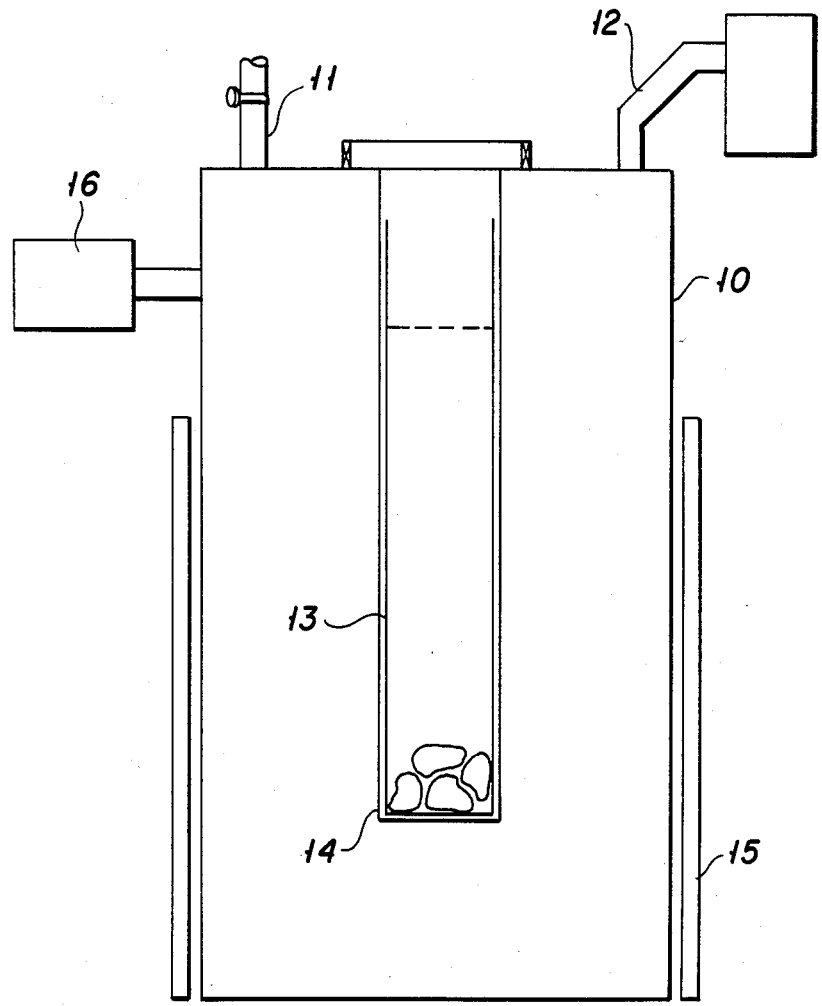
FIG. 1 is a schematic representation of a basic apparatus employed in the invention.

FIG. 1 schematically illustrates a basic apparatus used to produce aerogels. An autoclave 10 functions as a reaction chamber for the production of the pelletized aerogels. The autoclave 10 includes pressure vents 11, fluid removal vents 12 and a support mechanism 13 for mounting a reactant container 14. Also included with the autoclave 10 are a heat source 15 and a vacuum system 16 for creating the vacuum in the autoclave. The autoclave must be capable of maintaining the reaction liquid above its critical temperature (from about 245° C. for MeOH to about 380° C. for $H_2O$) and pressure (from about 70 atm for MeOH to about 245 atm for $H_2O$). The heat source is typically an electric heater and the collecting system is, for example, a condenser/receiver for collecting the fluid phase from the autoclave.

In the process of the present invention, the initial step is preparing the pregel. Techniques for preparing specific pregels are described hereinafter and the preparation of other pregels are well known to those of ordinary skill in this art (See, for example, Teichner et al. "Inorganic Oxide Aerogels," supra). Usually, the support structure is initially exposed to the reactants by immersing it in the pregel. Prior to immersing the structure in the pregel, the structure is preferably preheated from about 25° to about 60° C. The pregel and support structure are then placed in the autoclave. The temperature and pressure are raised to above the critical temperature and pressure of the reaction liquid (hypercritical conditions) to convert the reaction liquid to a fluid phase. The specific temperature and pressure at which the liquid to fluid conversion takes place depends on the particular medium being used. Such conditions are either well known for a variety of different media or can be calculated by one of ordinary skill according to the procedures described in Reid et al., *Properties of Gases and Liquids*, Chapters 5-7. As an alternative to the immersing step, the support structure may be isolated from the pregel until hypercritical conditions are reached and then exposed to the fluid phase prior to venting. After conversion of substantially all the reaction liquid to fluid phase (and after structure exposure, if the alternative step is selected), the fluid phase is vented from the autoclave under hypercritical conditions to yield an aerogel which adheres to the support structure.

A typical procedure for the preparation of a pelletized aerogel is described herein for a $Cr_2O_3$ aerogel. Chromium(III) acetate (Alfa #16869) (68 g) was dissolved in 20 cc of water at 55° C. Absolute methanol (90 cc) was then added to yield 144 cc of solution (pregel). A major portion (approximately 110 cc) of this solution was supplied to 145 cc (140 g) of alpha-$Al_2O_3$ Raschig rings (approximately 0.48 cm O.D.-Norton) which had been preheated to about 60° C. in a 25 cm long×3½ cm (I.D.) pyrex tube. The solution level was just above the level of the Raschig rings. The pyrex tube was then inserted into the autoclave and heated to 296° C. The autogenous pressure of 2320 psig was slowly reduced by venting (while maintaining the temperature above 255° C. until all the fluid phase was removed) and the product was purged with $N_2$. Of the 150 g of product recovered, 4.5 g of $Cr_2O_3$ aerogel was removed as minus 20 mesh fines. The remainder of the $Cr_2O_3$ aerogel was distributed in the rings (10 g) and as minus 8, plus 20 mesh course granules (9.1 g).

Generally, the aerogels exist as fine, dusty materials or as light, chunky materials. With our invention, the difficulties associated with these forms can be circumvented by the use of a variety of support structures ranging from vermiculite to distilation rings. The actual filling of these forms is influenced by the nature of the aerogel product. For example, light-chunky particle products can fill large open form support structures (approximately 1.8 cm openings). With a dusty type of aerogel [e.g., $Cr_2O_3$ derived from $Cr(OAc)_3$] more cohesive products are possible such as vermiculite-aerogel composites and boiling stone-aerogel composites.

With our process, the aerogels cling tenaciously to the supporting structures. This phenomenon was unexpected. To the contrary, it was expected that the venting of the fluid phase under hypercritical conditions would remove the aerogel from the supporting structures. While it is not exactly clear why the aerogels cling to the support structure, two reasons are offered. Under hypercritical conditions, the fluid phase (produced from the reaction liquid) may serve to superclean the surface of the supporting structure, thus producing the strong adherence characteristic. Alternatively, there may be some chemical interaction of the supercritical fluid phase upon the surface of the support structure which results in weak bonding of the aerogel to the support structure.

Our novel technique for forming pelletized aerogels is applicable with a wide variety of supporting structures. These supporting structures include: honeycombs (such as corderite or Torvex®); Raschig rings; wire mesh screens (or forms); FiberFrax®; vermiculite; boiling stones; glass or metal tubing; and, insulation block (precalcined).

Figure 2:
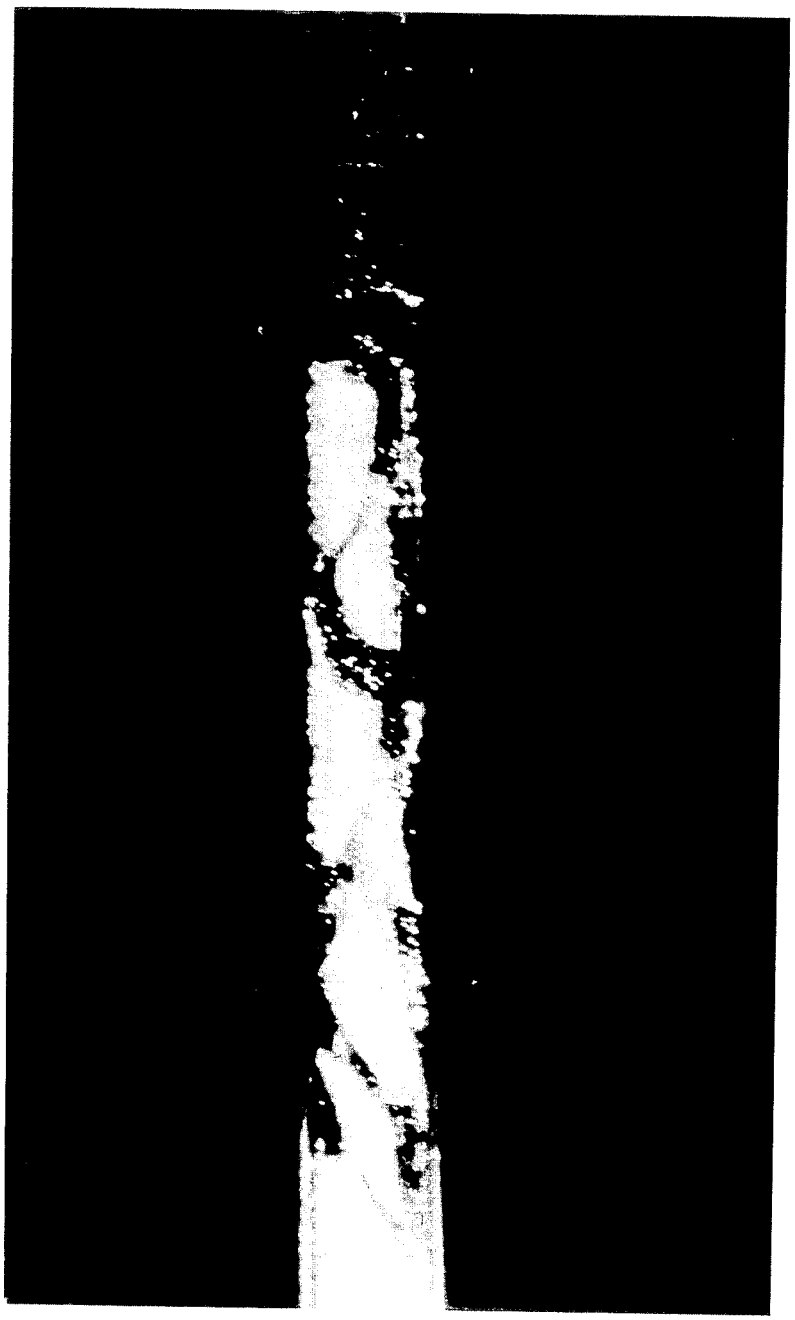
FIG. 2 illustrates the formation of a silica aerogel within a glass capillary (magnification approximately 10×).

FIG. 2 illustrates the formation of a silica aerogel within a glass capillary. The aerogel adheres to the glass surface quite strongly and cannot be tapped out of the capillary. This behavior is observed using glass tubes with large diameters (greater than 0.6 cm I.D.). Looking closely at the aerogel within the capillary of FIG. 2, an irregular channel is apparent. The presence of the channel indicates the mass of aerogel within the capillary is quite porous. The physical properties of the composite are remarkably stable. For example, no change in properties was observed upon heating the composite to 400° C. for 90 minutes in air.

Figure 3:
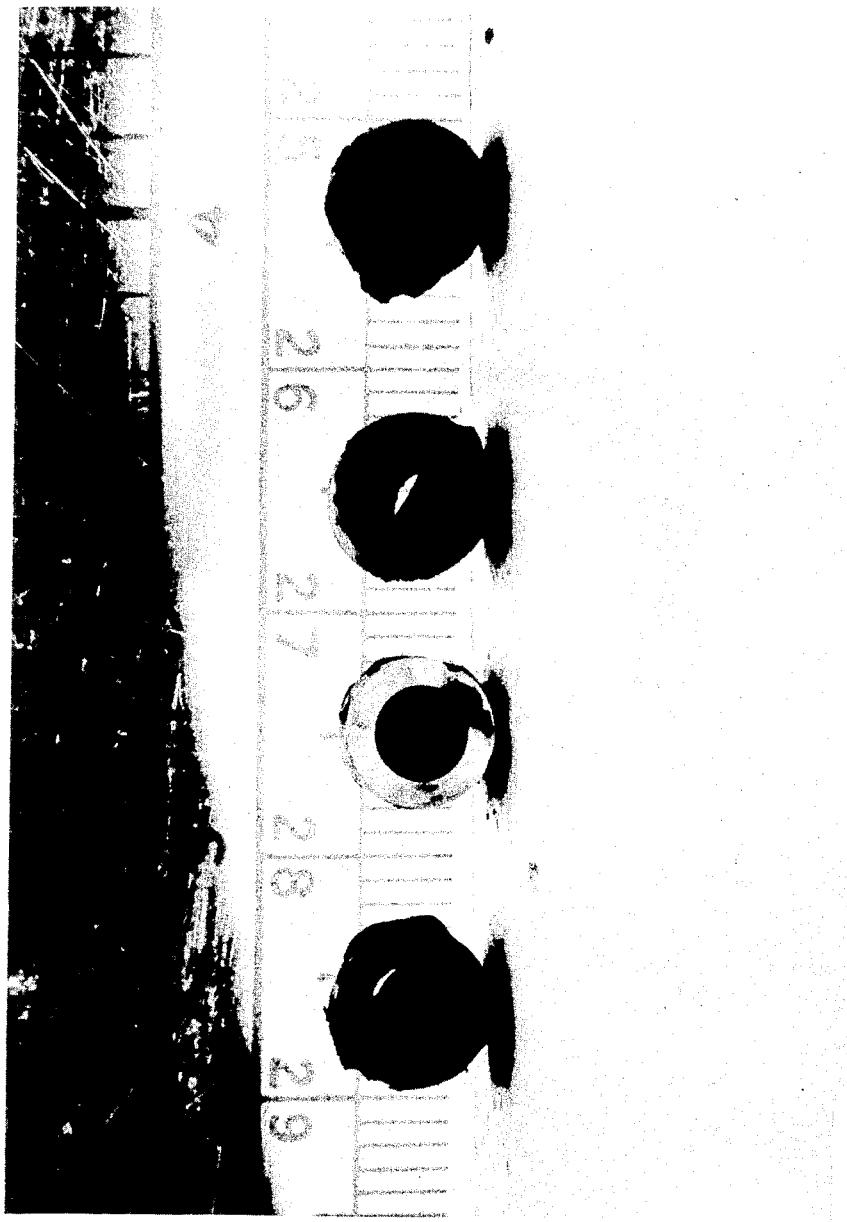
FIG. 3 illustrates a chromia aerogel supported on and within Raschig rings.

FIG. 3 illustrates a $Cr_2O_3$ aerogel supported on and within alumina Raschig rings (0.62 cm O.D.). Most of the rings appear to be completely filled; however, some show an open channel through their entire length. In this instance, the $Cr_2O_3$ aerogel was derived from approximately 6 g $CrO_3$ (0.06 mole Cr) in approximately 120 cc MeOH-$H_2O$. The degree of filling is important in providing good contact and in avoiding excessive pressure drops when these materials are used, for example, as a packed bed catalyst. It is an additional feature of our invention (and discussed later) to control the filling of openings in supporting structures to some degree by varying the concentration of solute in the pregel.

It is very important to note that the aerogel does not totally encase the supporting structure. It may cling to the outer surface, but it does not build up excessively on the outer surface. Actually, the aerogels tend to accummulate in the open pores of the support structure. The reason for this is not known but the phenomenon is clearly apparent in FIGS. 4–7.

Figure 4:
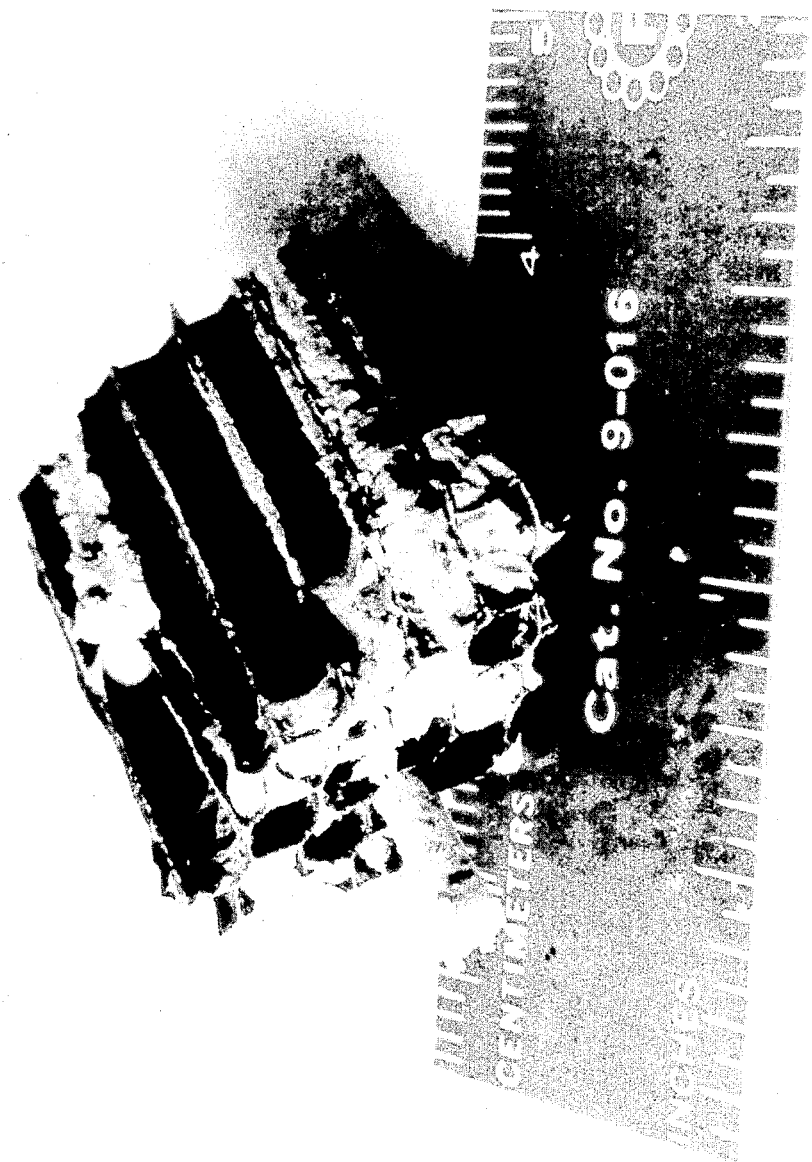
FIG. 4 shows a platinum/silica aerogel in a sample of corderite.

FIG. 4 shows a Pt($\approx$1%)/SiO$_2$ aerogel (normally a chunky aerogel) in a sample of cordierite. The grey aerogel product can be pushed through the honeycomb channels—but only with considerable effort.

Figure 5:
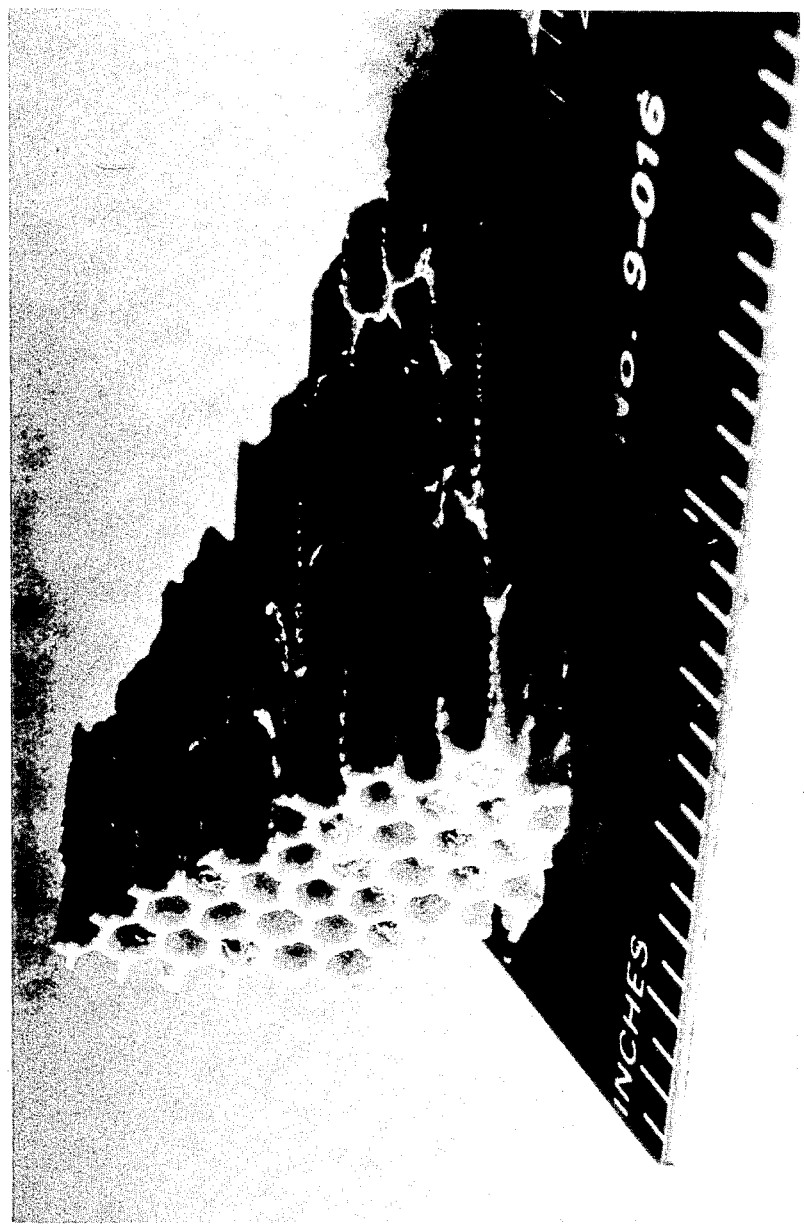
FIG. 5 is an example of a dusty aerogel encased in a sample of Torvex ®.
Figure 6:
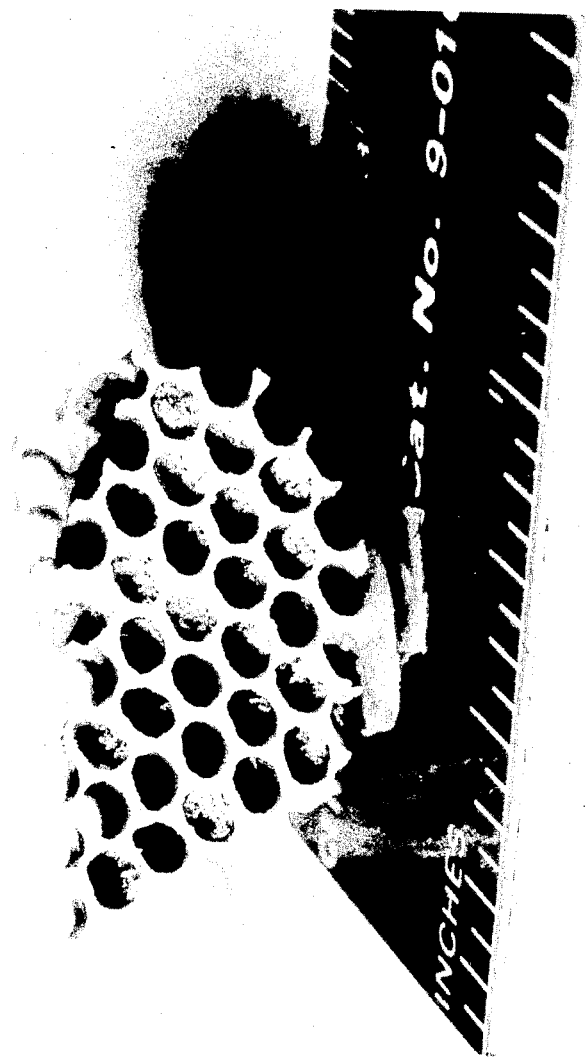
FIG. 6 is a different view of the dusty aerogel-Torvex ® composite shown in FIG. 5.

FIGS. 5 and 6 are examples (from different angles) of a dusty aerogel (Cr$_2$O$_3$) encased in a Torvex ® support structure. In these samples, the Cr$_2$O$_3$ aerogel was derived from Cr(OH)$_3$ (0.021 mole Cr) in 125 cc MeOH-H$_2$O. The Cr$_2$O$_3$ remains tightly encased within the honeycomb and can only be removed by severe tapping on a hard surface.

Figure 7:
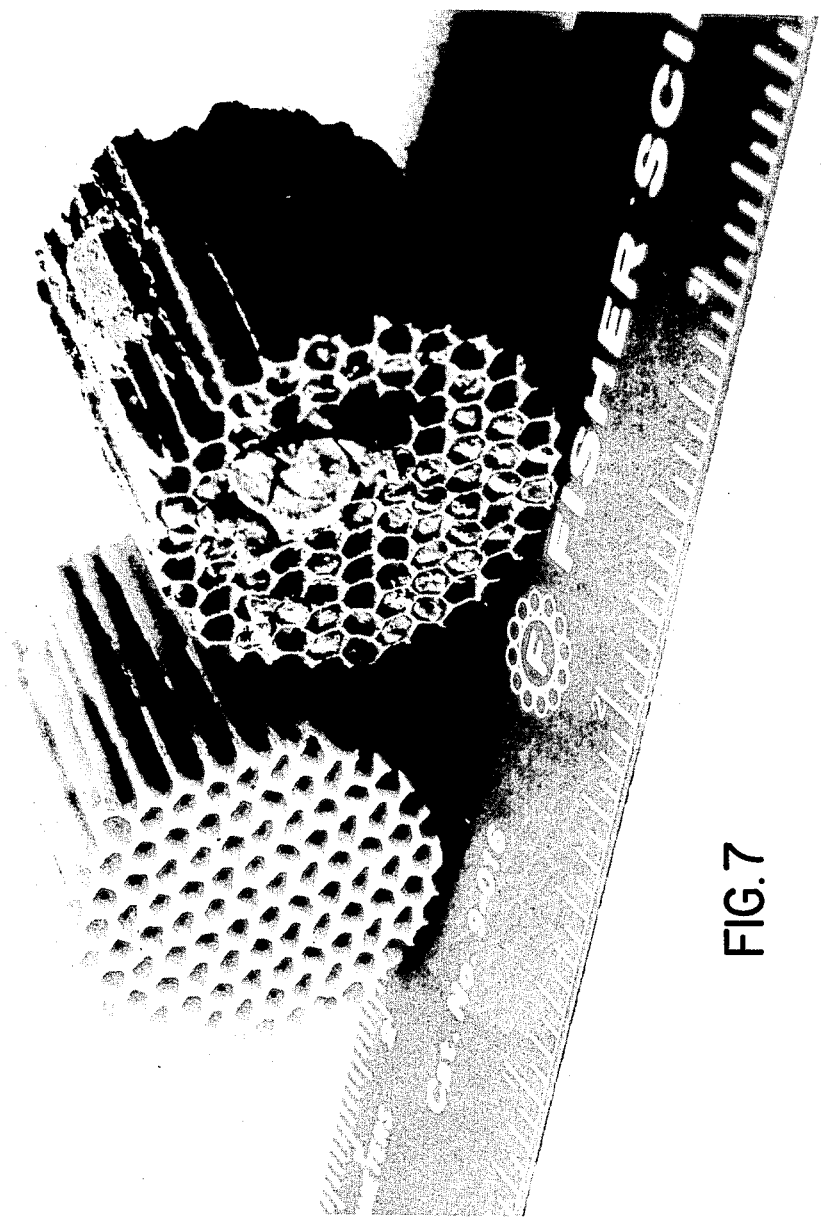
FIG. 7 is an example of highly concentrated chromia aerogel encased in a sample of Torvex ®.

FIG. 7 is another example of a more highly concentrated Cr$_2$O$_3$ aerogel [derived from 48 g of Cr(OAc)$_3$ (0.019 mole Cr) in 95 cc of MeOH-H$_2$O] encased by a Torvex ® support structure. The higher concentration of solute tends to produce a product in which the aerogel penetrates the pores within the walls of the Torvex ® support structure itself.

Figure 8:
FIG. 8 shows chromia aerogels accumulated in crevices of boiling stones.
Figure 9:
FIG. 9 illustrates the effects of changing solute concentration on an aerogel-boiling stone composite.

The tendency of aerogels to accumulate in the crevices of boiling stones is illustrated in FIGS. 8 and 9. FIG. 8 shows a Cr$_2$O$_3$ aerogel (same composition as used in FIG. 3) supported by Hengar alundum, boiling stones. The aerogel is tightly wedged into the crevices with additional aerogel being deposited upon the aerogel contained in the pores, while the outer surface of the boiling stone itself is reasonably bare. FIG. 9 is another example of a dusty aerogel [Cr$_2$O$_3$ derived from 35 g Cr(OAc)$_3$ (0.14 mole Cr) in 125 cc MeOH-H$_2$O] obtained from a more highly concentrated aerogel of Cr(OAc)$_3$ containing the same boiling stones. The boiling stones in FIG. 9 are much more densely coated with aerogel. Boiling stones free of aerogel are illustrated, for comparison, at the far right of FIG. 9.

Figure 10:
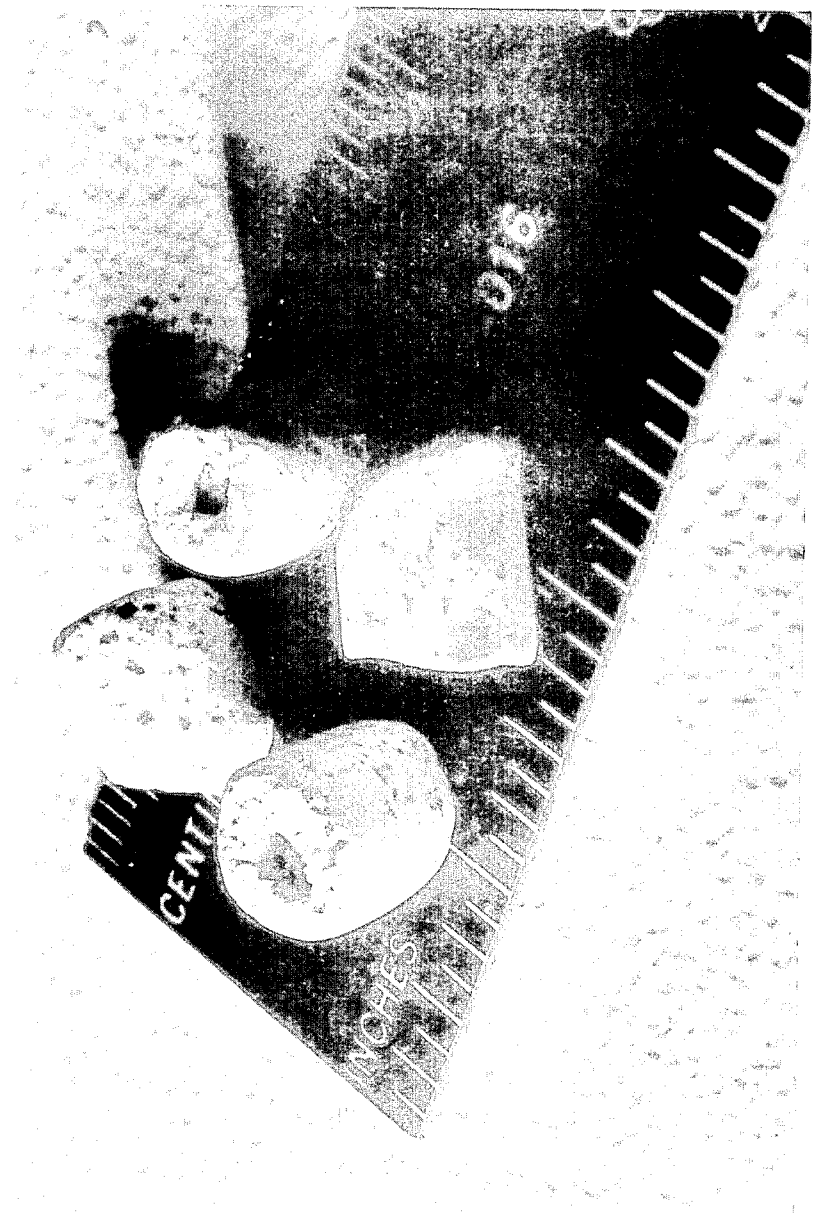
FIG. 10 demonstrates the ability of an aerogel to accumulate in shallow craters of Raschig rings as well as in the large hollow openings.

FIG. 10 illustrates irregular Raschig rings (0.48 cm I.D., Al$_2$O$_3$) which accumulate aerogel [Cr$_2$O$_3$ derived from Cr(OH)$_3$ (0.021 mole Cr) in 125 cc MeOH-H$_2$O] in the shallow craters on the surface as well as within the large hollow opening of the rings.

Figure 11:
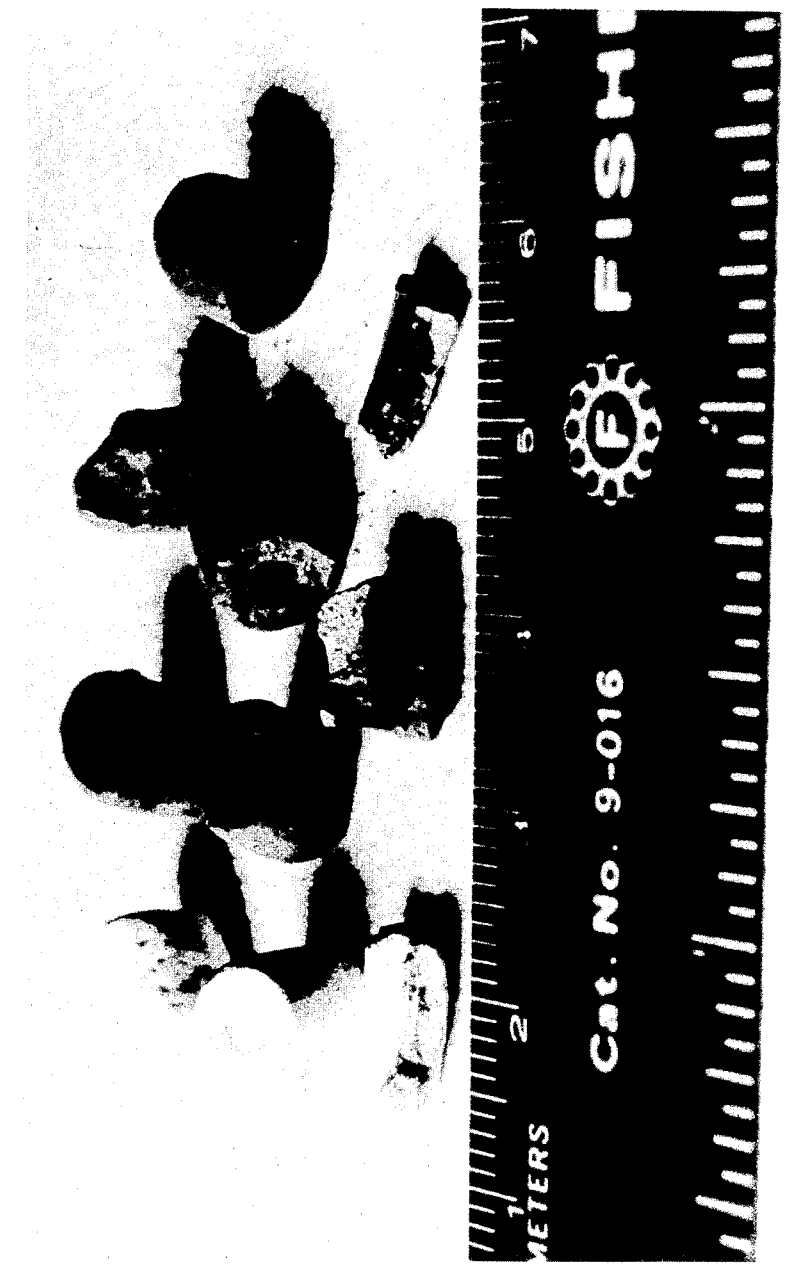
FIG. 11 is an example of the results of employing a very high solute pregel on an aerogel-Raschig ring composite

Stated supra, by increasing the concentration of the Cr(III) salt used to prepare the Cr$_2$O$_3$ aerogel, one can form a more cohesive product. In addition, one can accumulate the aerogel substantially throughout some support structures. In FIG. 11, a much more concentrated solution of Cr(III) acetate in MeOH (96.8 g in 110 cc) was employed in combination with Al$_2$O$_3$ Raschig rings. As compared to FIG. 10, the Raschig ring in FIG. 11 shows a marked color change (becoming dark green). Upon slicing the ring, the green color of Cr$_2$O$_3$ had thoroughly permeated the Al$_2$O$_3$.

Figure 12:
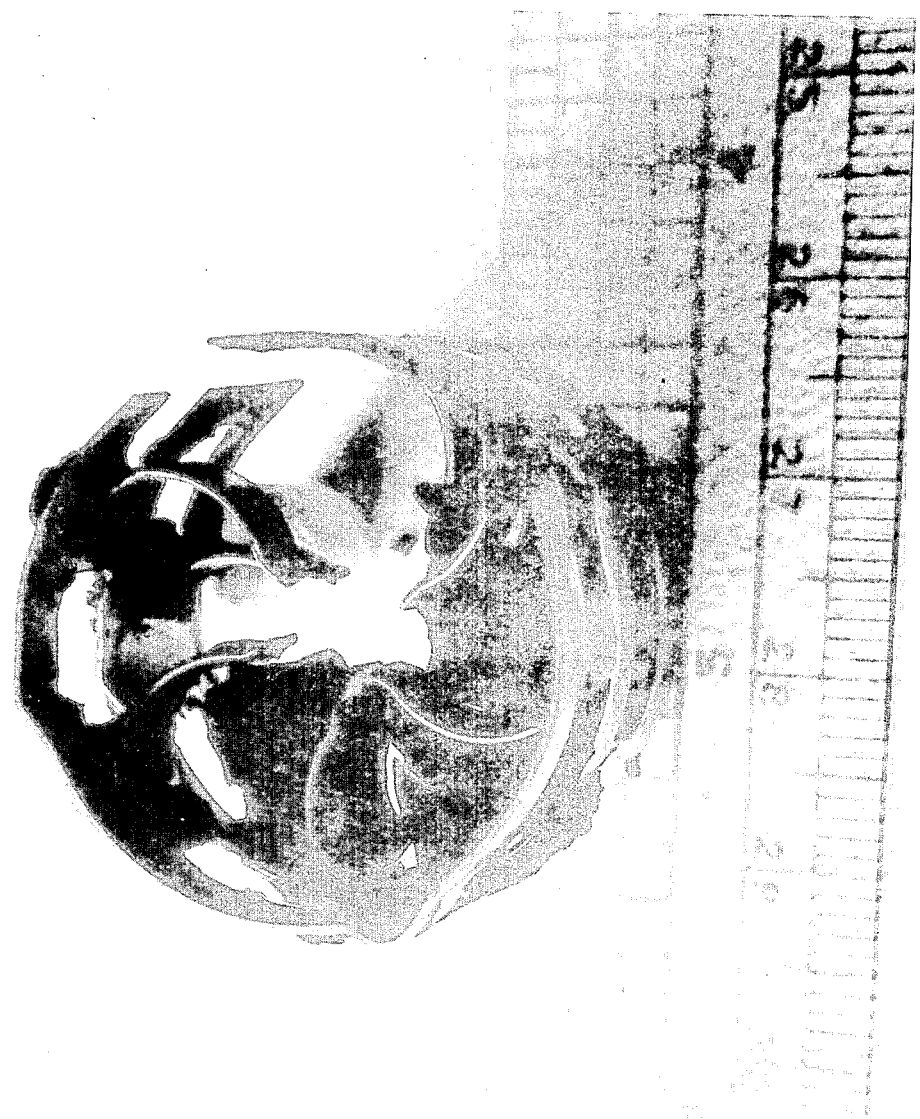
FIG. 12 shows a sample of chromia aerogel encased in a large Pall ring.

Larger open form supports ($\approx$3 cm diameter) are also useful to encase aerogels. This is readily observed with a more gel-like (chunky) product such as that obtained from CrO$_3$ in methanol. FIG. 12 shows a sample of CrO$_3$-derived aerogel encased within a large Pall ring. The Cr$_2$O$_3$ aerogel adheres tightly to the steel surface of the ring.

Figure 13:
FIG. 13 shows an aerogel adhering to and "woven" through a wire screen.

One of the most surprising results associated with our process is shown in FIG. 13. A piece of $\approx$25 mesh stainless steel wire gauze was employed in combination with CrO$_3$-based Cr$_2$O$_3$ aerogel. The gel-like (chunky) product was firmly bound onto the screen. Note with particular interest the definite weaving of the aerogel product through the openings of the screen.

Figure 14:
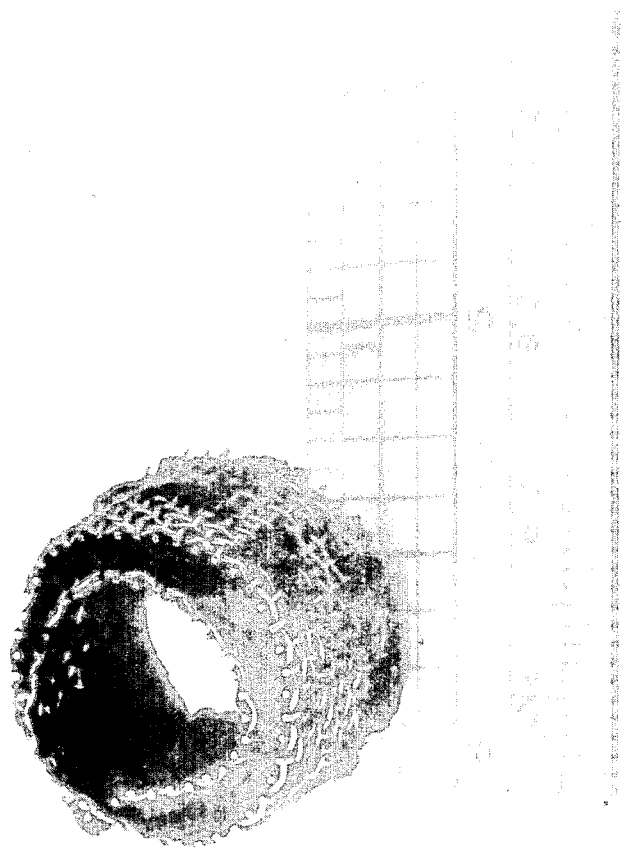
FIG. 14 illustrates not only surface binding of an aerogel to a screen but also the tendency to form a solid annulus.

A particularly advantageous modification of the basic results depicted in FIG. 13 is shown in FIG. 14. Spiral of the same stainless steel mesh was added to a Cr$_2$O$_3$-containing alcogel (alcohol based pregel). As illustrated, the Cr$_2$O$_3$ aerogel produced therefrom not only binds to the surface of the screen (with the weaving pattern observed supra) but also tends to form a solid annulus by filling the through channels. The filling effect has also been observed in cubes, spheres and cylinders made of wire gauze. With these structures, the aerogel (including any dusty aerogel) will be encased within the framework of the screen. This type of composite material would be particularly advantageous in catalytic processes because catalyst loss would be reduced in a reactor while aerogel surface area would be maximized.

Figure 15:
FIG. 15 illustrates the entrapment of dusty aerogels in a variety of microporous materials.
Figure 16:
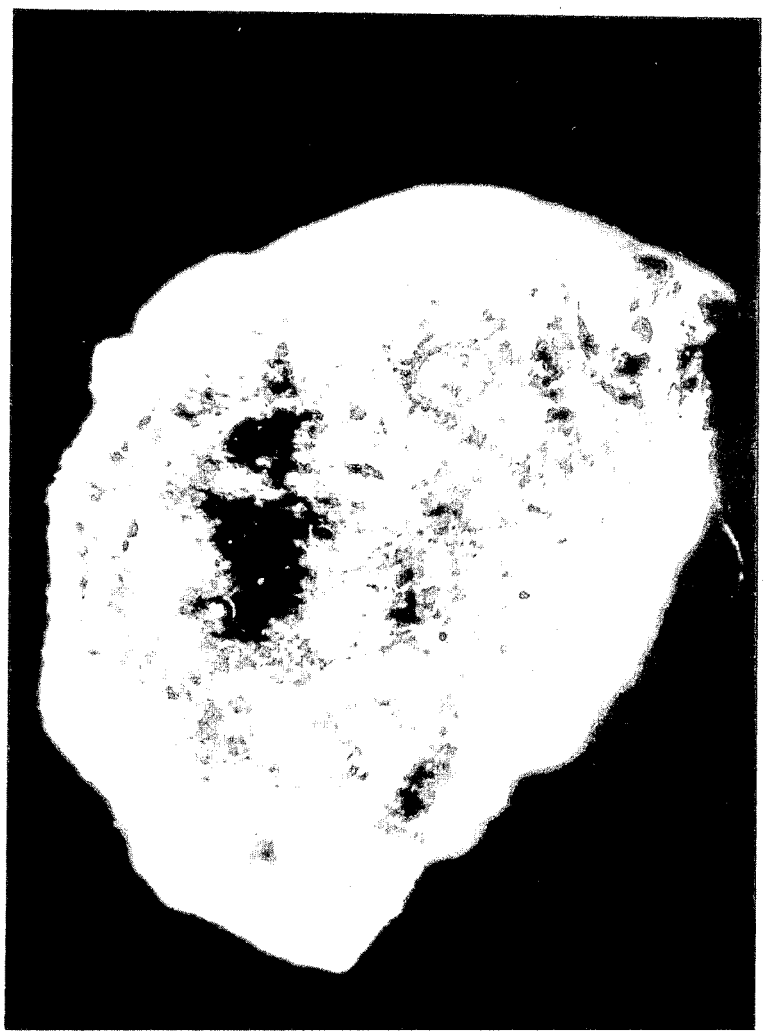
FIG. 16 shows a chromia aerogel entrapped in a FiberFrax ® structure.

The dusty aerogel products can also be entrapped within micro-porous materials such as vermiculite, FiberFrax ® or insulation block. FIG. 15 shows extrapment of Cr$_2$O$_3$ aerogel [derived from Cr(OA$_c$)$_3$ (0.040 mole Cr) in 122 cc of MeOH-H$_2$O] in vermiculite (left), insulation block (center) and FiberFrax ® (right). In the case of FiberFrax ®, the micropores appear to act like a sponge in accumulating dusty aerogel deep within the pores (see also FIG. 16).

While we have described preferred embodiments of our invention, those or ordinary skill in this art will recognize modifications, changes and alterations which would not depart from the scope of the invention defined by the appended claims.

We claim:

1. A process for the production of products comprising aerogels, the process comprising the steps of:
   (a) producing a pregel comprising a reaction liquid and an aerogel-forming composition;
   (b) heating the pregel to hypercritical conditions such that the reaction liquid is converted to a fluid phase;
   (c) venting the fluid phase under hypercritical conditions to yield an aerogel; and
   (d) exposing an object to the aerogel-forming composition prior to venting to cause the aerogel to collect on the object.

2. The process of claim 1 wherein the object has an open form.

3. The process of claim 1 wherein the object is exposed to the aerogel-forming composition prior to heating the pregel.

4. The process of claim 1 wherein the object is at least partially immersed in the pregel.

5. A product comprising:
   (a) a support material; and
   (b) an aerogel adhering, in the absence of a bonding medium, to at least a portion of the support material, the bulk density of the adhering aerogel being substantially the same in the final form of the product as the bulk density of the aerogel upon formation thereof.

6. A product as in claim 5 wherein the support material is a porous structure and the aerogel accumulates within the pores of the structure.

7. A product produced by the process of claim 1.

* * * * *